United States Patent [19]
Lund et al.

[11] Patent Number: 5,536,394
[45] Date of Patent: Jul. 16, 1996

[54] END OF LIFE MECHANISM FOR WATER TREATMENT CARTRIDGE

[75] Inventors: James L. Lund, Lake Elmo; David J. Emmons, Plymouth; Richard D. Hembree, Edina, all of Minn.

[73] Assignee: Recovery Engineering, Inc., Minneapolis, Minn.

[21] Appl. No.: 341,420

[22] Filed: Nov. 17, 1994

[51] Int. Cl.⁶ ............................................. B01D 35/143
[52] U.S. Cl. ......................... 210/87; 116/273; 210/100; 210/123; 210/475
[58] Field of Search ...................... 210/85, 87, 94, 210/100, 121, 123, 282, 470, 472–477, 482; 222/14, 17, 18, 20, 36, 189; 116/264, 273

[56] References Cited

U.S. PATENT DOCUMENTS

| | | | |
|---|---|---|---|
| 871,253 | 11/1907 | Bauman | 222/36 |
| 2,669,707 | 2/1954 | Ehrman | |
| 3,687,289 | 8/1972 | Tischler | 210/89 |
| 4,623,457 | 11/1986 | Hankammer | 210/482 |
| 4,650,571 | 3/1987 | Anderson | 210/86 |
| 4,698,164 | 10/1987 | Ellis | 210/739 |
| 4,895,648 | 1/1990 | Hankammer | 210/477 |
| 4,969,996 | 11/1990 | Hankammer | 210/476 |
| 5,057,821 | 10/1991 | Card | 340/610 |
| 5,065,901 | 11/1991 | Brane et al. | 210/100 |
| 5,089,144 | 2/1992 | Ozkahyaoglu et al. | 210/767 |
| 5,128,034 | 7/1992 | Kool | 210/232 |
| 5,139,666 | 8/1992 | Charbonneau et al. | 210/475 |
| 5,190,643 | 3/1993 | Duncan et al. | 210/100 |
| 5,236,578 | 8/1993 | Oleskow et al. | 210/87 |
| 5,328,597 | 7/1994 | Boldt et al. | 210/87 |

*Primary Examiner*—Joseph W. Drodge
*Attorney, Agent, or Firm*—Merchant, Gould, Smith, Edell, Welter & Schmidt

[57] ABSTRACT

An apparatus for use with a water treatment unit and in particular, those having a treatment cartridge, that indicates the end of life of the unit. The apparatus comprises a housing with at least one opening for the passage of liquid to a chamber, formed by the interior of the housing and the water treatment unit. The chamber includes a support member mounted to the housing. A float is rotationally mounted on the support member. The support member limits float movement to a predetermined distance upon each rotation of the float, resulting from each cycle (use) of the water treatment unit. Once the float has made a specific number of rotations and has travelled the complete distance of the support member (as water fills and drains from the chamber), the float rests in a position where it is visible through an opening in the housing, indicative of the end of life of the water treatment unit.

16 Claims, 9 Drawing Sheets

1
END OF LIFE MECHANISM FOR WATER TREATMENT CARTRIDGE

FIELD OF THE INVENTION

The invention relates to water treatment cartridges, and in particular to a mechanism for indicating the end of the effective life of the water treatment cartridge.

BACKGROUND OF THE INVENTION

The quality of community-supplied water has come under increased scrutiny. Consumers have become aware of decreasing water quality and have turned to water treatment devices to remove undesirable chemical and/or microbiological components in the water. Domestic and commercial water treatment devices are well known in the art. Typical devices are incorporated into a water system either in-line, at a terminal end, or as a self-contained system which processes water in batches. An example of an in-line system would be an under-the-counter device which filters water prior to reaching the faucet. Terminal end devices include countertop and faucet-mounted filtration units. Self-contained batch devices rely on an influent holding chamber and an effluent holding chamber which are connected through a filtration cartridge.

Typical water treatment devices use mechanical filtration or chemical removal media. Mechanical filters treat water by preventing passage of particulates such as sediments, turbidity, and if fine enough, colloidal matter. As a mechanical filter approaches the end of its useful life, reduced or stopped flow due to particulate accumulation provides a ready indication that element replacement is necessary.

Chemical removal media (e.g. charcoal-based media and ion exchange media) employ processes such as adsorption and ion exchange for removing undesirable chemical species. The problem with chemical removal media is that the removal of undesirable chemicals eventually decreases and stops as the effective life of the chemical removal media ends, and the cartridge does not provide any indication to the user that the chemical removal media therein is no longer effective.

As a result, various approaches have been taken to indicate end of life to the user where it is not inherently provided by the behavior of the media. One example is shown in U.S. Pat. No. 4,686,037 (Lang). In this approach, a pre-filter is used to entrap contaminants, and the color of the pre-filter is compared by the user with a reference strip to determine when the media requires replacement. Drawbacks to this approach, are that color determination involves human judgment, making it subjective and subject to error. Additionally, users may easily forget to check the reference pre-filter and mistakenly believe the spent media is still treating the water passing through the pre-filter.

A more accurate means of indicating end of life of conventional treatment units is through devices which use a process known as "flow totalization." These devices totalize the liquid volume which has passed through the media. Flow totalization-based devices have become recognized as the most accurate means for end of life indication. For example, NSF International, the certifying agency in the United States for water treatment devices, requires for certification of rated volume use of twice the filter media capacity when an end of life indication means is not used, and only 20% additional capacity when an indicator is employed.

2

Both electrical and mechanical approaches to "flow totalization" are disclosed in the prior art. U.S. Pat. No. 4,918,426 (Butts et al.) and U.S. Pat. No. 5,089,144 (Ozkahyaoglu et al.) disclose the electrical approach. The devices disclosed in these patents use pressure transducers with outputs which are integrated to calculate total volume. After a predetermined volume has been reached, a valve is electrically actuated to stop flow.

Examples of mechanical devices are disclosed in U.S. Pat. No. 4,681,677 (Kuh et al.) and U.S. Pat. No. 4,698,164 (Ellis). These devices typically include a turbine interconnected with a series of gears which mechanically "add up" the volume of water passed through the device. The gears are interconnected with a valve such that, after a predetermined volume of water has passed through the device, the valve is mechanically actuated to stop flow.

Although flow totalization addresses the end of life problem, there are drawbacks. One drawback is that flow totalization devices are expensive and complex, as they must be designed to exacting specifications. An additional drawback with mechanical flow totalization devices is that the automatic indicator mechanisms, are generally too bulky to be included in a compact device. Moreover, they are not practical for a batch device which operates at low flow rates and low pressures.

In that regard, the consumer batch filtration field includes devices such as carafe units, for example, U.S. Pat. No. 4,895,648 (Hankammer), and a Mr. Coffee®, Model No. WF 1. The Hankammer ('648) patent discloses a device including an annular surface of a disk with markings indicative of the months of a calendar year and an adjustable pointer. After the filter is installed in this device, the pointer is set to the month that the device was installed.

A drawback to this device is that its life expectancy is based on an estimate, and it does not actually determine when the effective life of the cartridge is over. Furthermore, even if the pointer was set on the appropriate month during which the filter cartridge is to be replaced, the manufacturer presumes a set number of uses per time period for the purpose of calculating useful life. As a result, varied usage is not accounted for.

The Mr. Coffee® carafe includes a mechanical ratchet mechanism connected to an indicator dial and the water outlet of the carafe. Upon use, the user manually actuates the ratchet mechanism once for each pitcher of treated water desired. As a result, the estimated lifetime of the filtration media is more accurately tied to the volume of the water actually treated. When filtration of a batch of water is desired, a window connected to a stiff spring is slid open, which simultaneously increments the ratchet mechanism and shuts the exit port. The ratchet mechanism is connected to the visual indicator dial. After filling the carafe, the window is shut, which opens the exit port. Once the indicator dial reaches the end of life position, a key is used to reset the rachet/spring mechanism.

This device exhibits drawbacks in that its use is inconvenient as the window must be actuated in each direction when a carafe of purified water is desired. Additionally, the key is crucial to proper operation, and if lost, the device is rendered useless. Moreover, this device is bulky and requires a large number of intricate and expensive components.

SUMMARY OF THE INVENTION

The present invention overcomes the drawbacks of the prior art by providing an apparatus for a water treatment cartridge with an inexpensive automatic indicating means, which can be used in a system for producing batches of liquid product, i.e. carafe water purifiers, juice makers, coffee makers, iced tea makers, etc. This apparatus includes a mechanism which provides a visual indication, as well as, in one embodiment, a restriction on water flow, when end of life is reached.

The present invention is directed to apparatus including a water treatment unit, a housing which in combination with the water treatment unit forms a chamber, and an end of life indicator for the water treatment unit. The housing has an opening for receiving water into the chamber. The chamber is in fluid communication with the water treatment unit. The end of life indicator is mounted in the chamber and includes a member and means for advancing the member towards an end point each time the chamber has a cycle of filling and emptying of water.

The apparatus of the present invention is particularly useful in a device having a container with first and second reservoirs separated by a wall. The apparatus for treating water and indicating end of life is mounted in the container and held relative to the wall between the first and second reservoirs. In that way, water flows from the first reservoir through the apparatus for treating and indicating to the second reservoir from which the water can be accessed for subsequent usage. The device as indicated is particularly useful in systems which make further use of the water, such as juice makers, coffee makers or iced tea makers.

The present invention is particularly advantageous because it is automatic, mechanically simple and reliable. The end of life indicator functions at the instance of a buoyancy or displacement force, weight, and a surface tension force, along with proper attention to center of gravity and center of buoyancy so that as water fills and empties from the chamber indicated forces cause appropriate torque to rotate a float member. Water treatment units can be subjected to a maximum number of such filling and emptying cycles before it becomes appropriate to replace or rejuvenate the unit.

In at least one embodiment, the float member provides its end of life indication while at the same time substantially closing the opening for water into the chamber which leads to the water treatment unit. The apparatus thus advantageously not only provides visual indication through the opening of end of life, but also substantially prevents water from flowing through, practically assuring the replacement or the rejuvenating of the water treatment unit.

The present apparatus is not only inexpensive due to its simplicity, but it need not be replaced when the water treatment unit is replaced or rejuvenated, it merely needs to be reset.

The apparatus and device of the present invention solves the problems of the prior art in a clever and satisfyingly simple fashion.

BRIEF DESCRIPTION OF THE DRAWINGS

The present invention will be described with reference to the accompanying drawings, wherein like reference numerals identify corresponding or like components.

In the drawings.

DETAILED DESCRIPTION OF THE DRAWINGS

Figure 1:
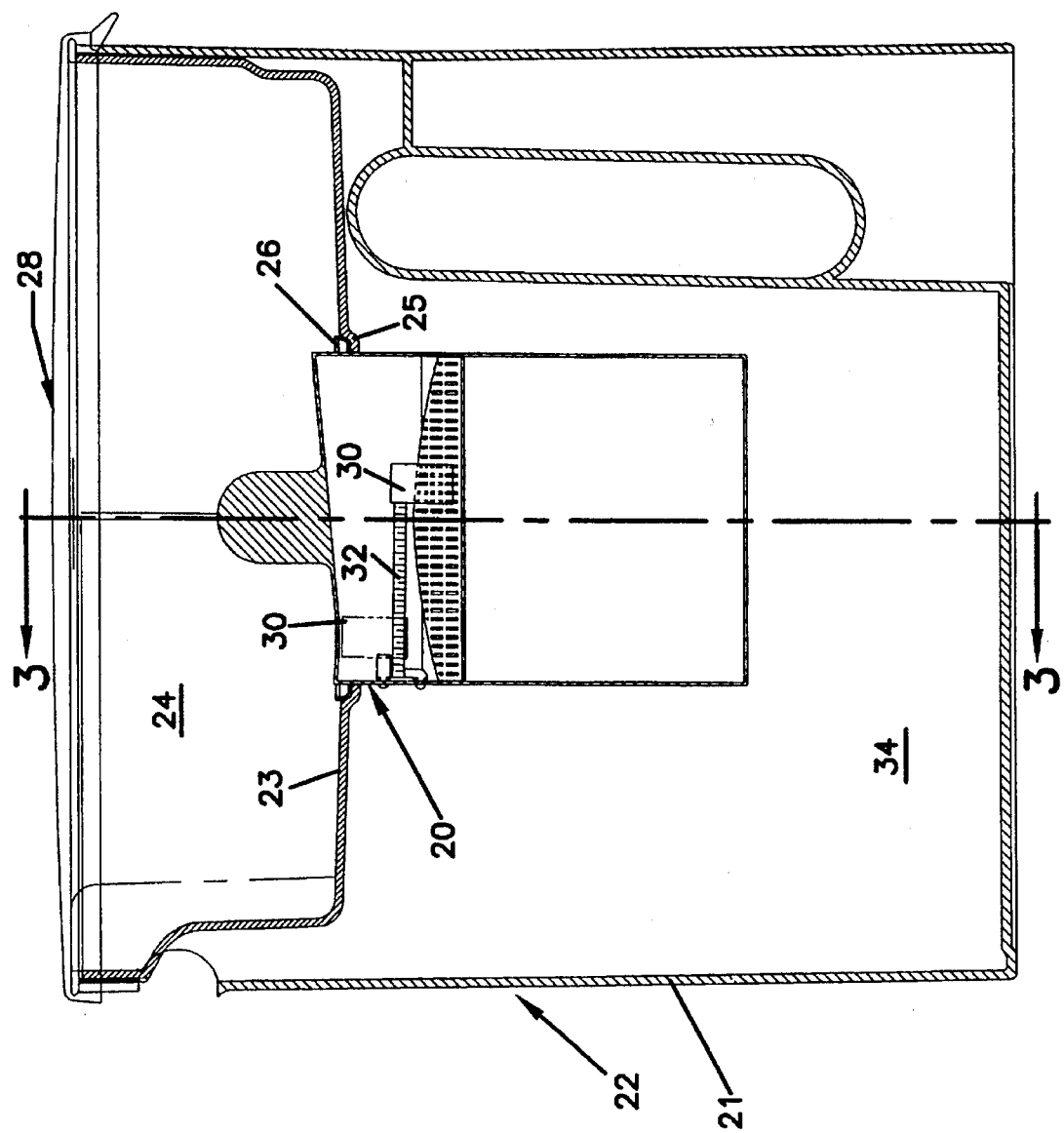
FIG. 1 is a longitudinal cross-sectional view of the apparatus of the present invention in use with a carafe, taken along line 1—1 of FIG. 2.
Figure 2:
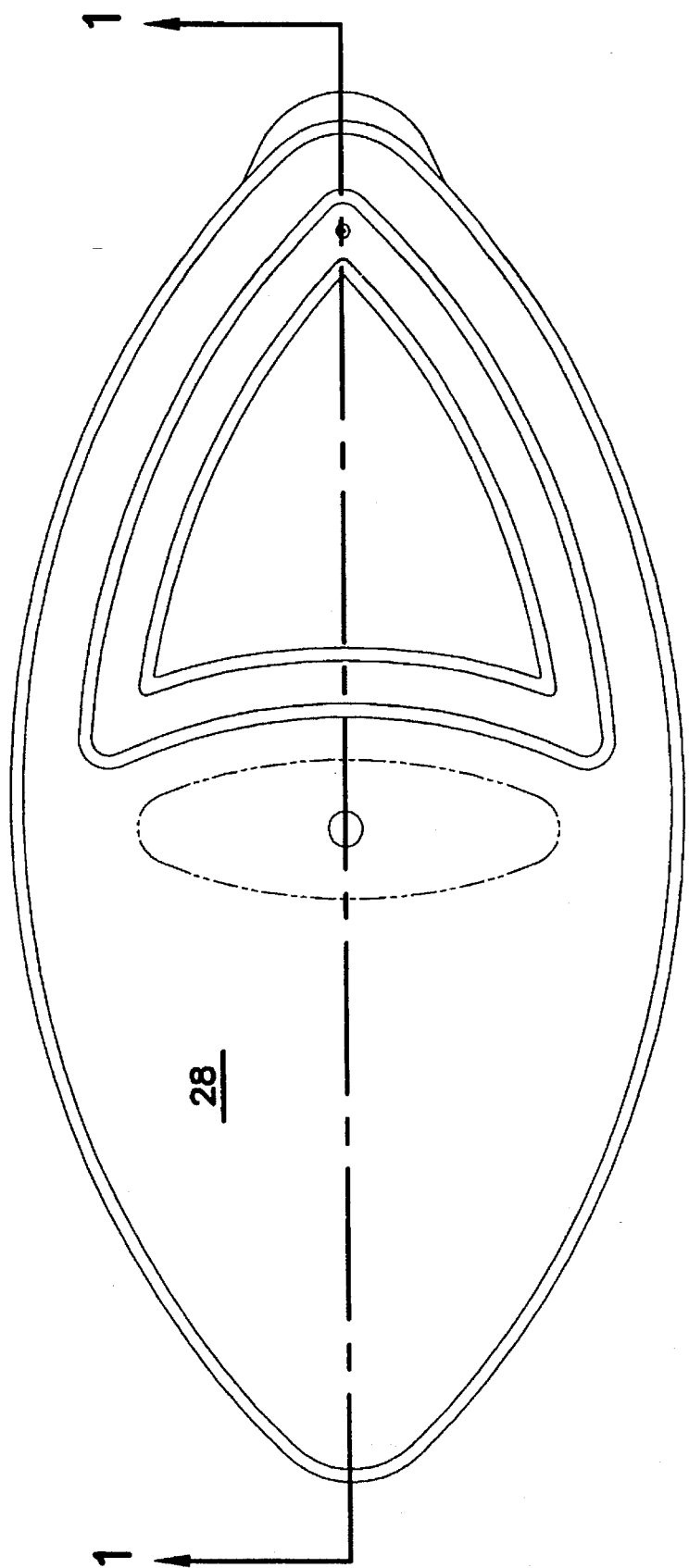
FIG. 2 is top plan view of the carafe.

FIGS. 1 and 2 show apparatus 20 of the present invention with a device known as a gravity-feed, water filtration carafe 22. Apparatus 20 is preferably removably mounted in a container 21 having a wall 23 as a floor of an upper reservoir 24 in a detent 25, preferably adapted to the shape of apparatus 20. Apparatus 20 includes a peripheral rim 26, cooperatingly shaped in accordance with the shape of detent 25. Water is poured into upper reservoir 24 by removing the lid 28 of carafe 22. Water passes through apparatus 20 and activates a float 30, which is rotationally mounted on a threaded rod 32, such that the float 30 rotates and moves toward an inverted terminal position (shown in phantom). The float 30, as rotated and shown in phantom, is indicative of the end of life for apparatus 20. After passing float 30, the water is treated, prior to entering the lower reservoir 34.

Figure 3:
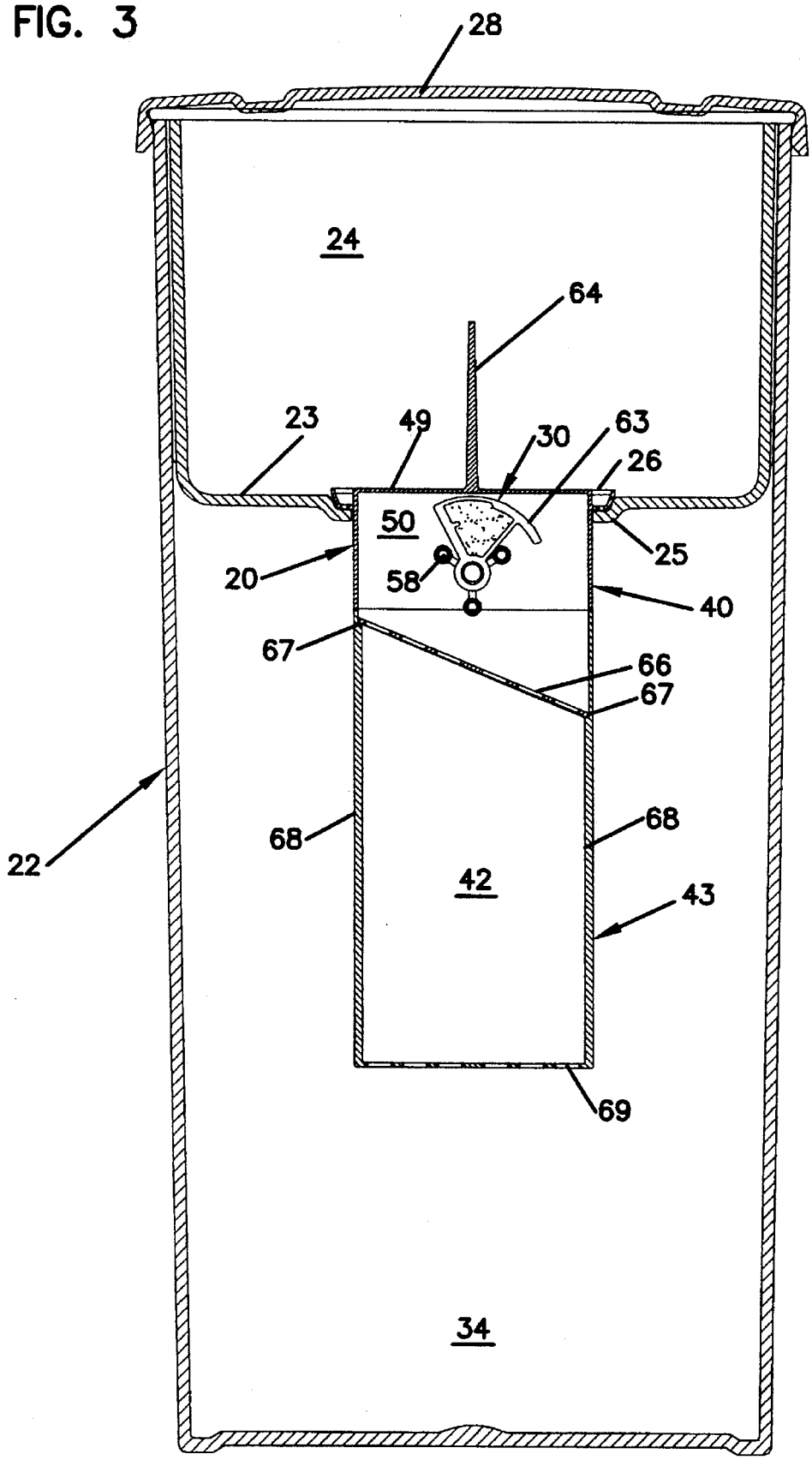
FIG. 3 is a lateral cross-sectional view taken along line 3—3 of FIG. 1.
Figure 4:
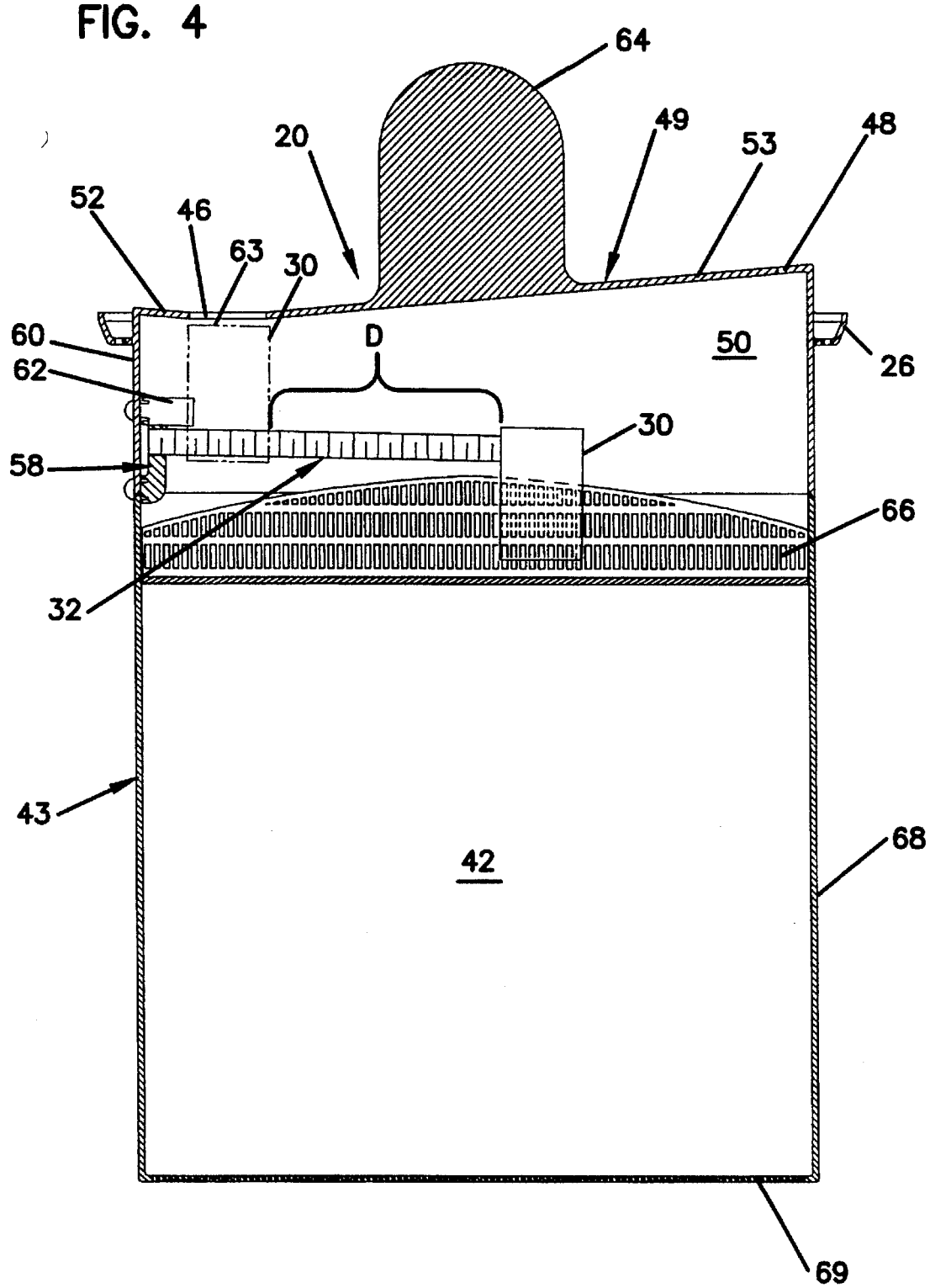
FIG. 4 is an enlarged longitudinal cross-sectional view of the apparatus of the present invention.
Figure 5:
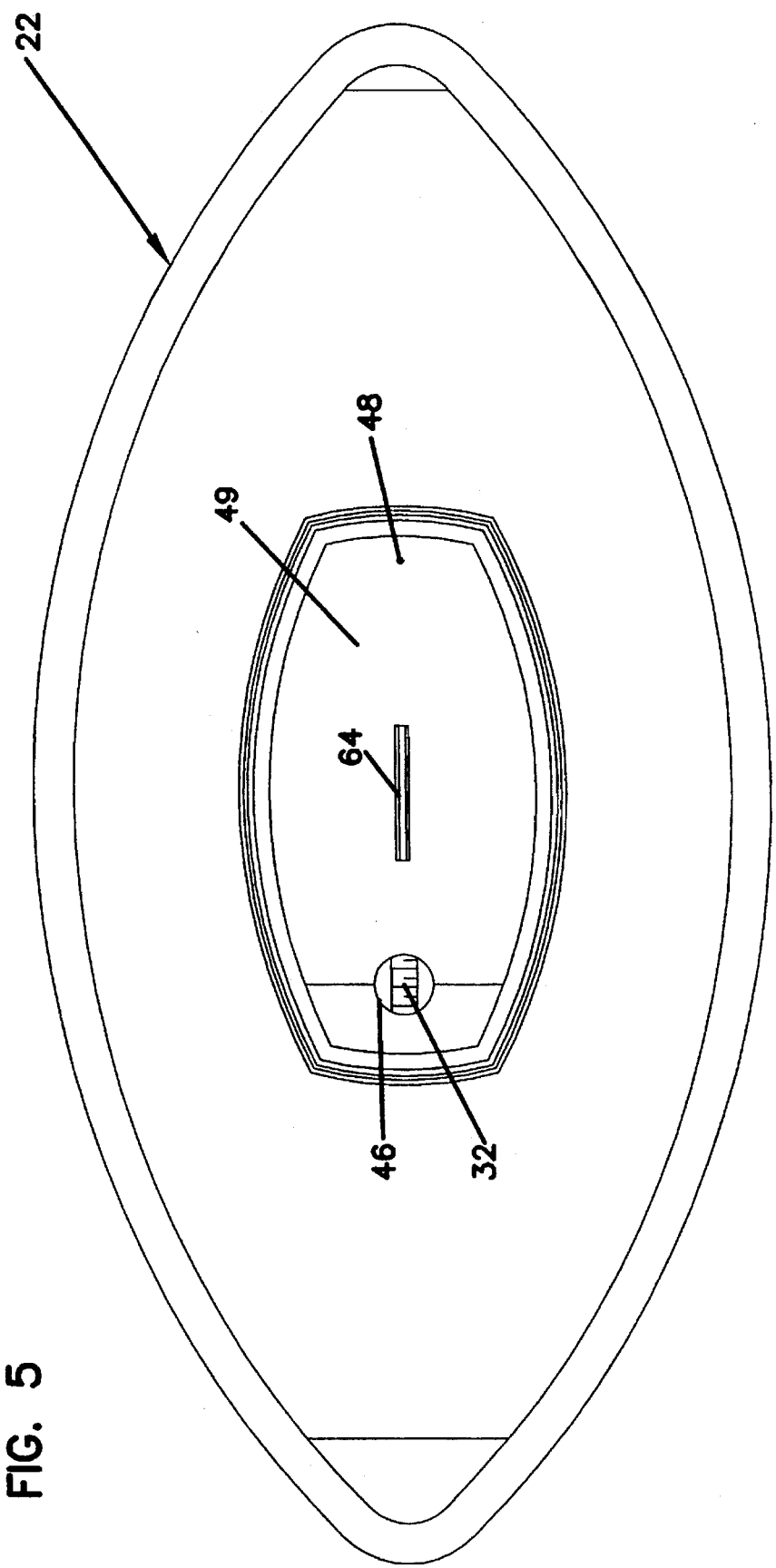
FIG. 5 is a top plan view of the apparatus of the present invention with the lid of the carafe removed.

Turning now to FIGS. 3–5, apparatus 20 is shown in detail. A housing 40 is attached to a conventional water treatment unit or cartridge 42, preferably forming an integral item. Cartridge 42 includes a holder 43 which preferably holds liquid treatment resin such as activated carbon, but may be designed to hold alternatively mechanical filters or other water purifying mechanisms. Cartridge 42 can be disposable or refillable or the like, such types of cartridges being commercially available.

Housing 40 includes an opening 46 and an air hole 48 along its top 49. Opening 46 and air hole 48 allow water to enter a chamber 50 formed by the top interior of housing 40 and the top of cartridge 42. Housing top 49 includes two inclined sections 52, 53, both inclined toward opening 46. Air hole 48 is in inclined section 53. Inclined section 52 is preferably at or below the level of the wall 23, functioning as the floor of upper reservoir 24 (FIG. 1) of carafe 22 (FIG. 1). In that way, the maximum amount of water poured into upper reservoir 24 (FIG. 1) can enter housing 40 through opening 46. Inclined sections 52, 53 are preferably inclined at approximately 5 degrees, so that the air hole 48 is above the level of wall 23 (FIG. 1) of the upper reservoir 24 (FIG. 1). As chamber 50 empties of water, air escapes from hole 48 to relieve the pressure in chamber 50 which then allows float 30 to function properly.

Float 30 is a member which is rotationally mounted on a threaded rod 32. Threaded rod 32 terminates in an end member 58 mounted to a sidewall 60 of housing 40. End member 58 is essentially a bracket for holding rod 32 with respect to housing 40. Once float 30 has traveled a distance D on the threaded rod 32, it comes to rest in an inverted terminal position against a ledge 62. Ledge 62 protrudes from end member 58. Float 30 in this inverted terminal position (FIG. 3, shown in phantom in FIG. 4), rests against ledge 62, such that its indicator (bottom) surface 63 can be viewed through opening 46. Indicator surface 63 is preferably red or other color which provides a sharp contrast to the color of the housing top 49. Accordingly, when float 30 has reached the inverted terminal position, the user is alerted that the cartridge is spent, or nearly spent, and should be attended to, by refilling, replacing, or otherwise revitalizing the cartridge, depending on the type of cartridge employed. If float 30 has not reached this inverted terminal position, the viewer will see the threaded rod 32 or a portion of float 30 in an upright (also known as the standard or starting) position on the threaded rod 32.

Additionally, when float 30 has reached this inverted terminal position, the distance between the top 49 of the housing 40 and the indicator surface 63 is very small. Float 30 in that position, thus also acts as a flow restrictor for water flow into chamber 50 thereby impeding subsequent flow of water through the cartridge 42, such that product, i.e., purified water, coffee, juice, etc., would be produced at an exceedingly slow rate, indicating to the user that the cartridge 42 is spent and should be attended to. Air hole 48 is of a small enough diameter, such that the surface tension of the water across it prevents fluid entry.

Housing 40 includes a tab 64 which the user holds when removing apparatus 20 from carafe 22 or separating housing 40 and cartridge 42, if housing 40 is designed to be separable from cartridge 42. If housing 40 is separable from cartridge 42, float 30 can be reset by either winding it backwards along threaded rod 32 or by sliding float 30 along the threaded rod 32, away from end member 58. If float 30 and rod 32 are made with sufficient clearance between the major diameter of the threaded rod 32 and the minor diameter of the threaded portion 76 of the float 30 (FIG. 7), float 30 can be slid with respect to rod 32 even though both are threaded.

Threaded rod 32 is pitched in proportion to the lifetime of cartridge 42. For example, if cartridge 42 functions for a predetermined number of cycles (uses), the length and pitch of threaded rod 32 is such that float 30 (which makes one revolution per cycle) will reach ledge 62 and rest in the inverted position when the last cycle (effective use) of the cartridge 42 has been completed.

Cartridge 42 includes a holder 43 with an inclined grate 66 at its upper end engaged with shoulders 67 cut into inner wall 68. Inclined grate 66, when combined with housing 40 serves as the bottom of chamber 50. Although an inclined grate 66 is preferred, various angles of inclination for grate 66 as well as a flat grate are also permitted. The lower end of cartridge 42 is also formed as a grate 69. Both grates 66, 69 include openings sized to retain the resin or other water purifying material cartridge 42, so it can not leave and enter the water. One or both of upper and lower grates 66, 69 may be removable from holder 43, in order that cartridge 42 be refilled or rejuvenated. Alternately, upper and lower gates 66, 69 may be permanently attached to holder 43, by adhesive bonding, sonic welding or the like, such that the cartridge is disposable. Cartridge 42 is preferably made of plastic, although other suitable materials are also permissible.

Housing 40 is preferably made of plastic and can be attached in a permanent or removable manner to cartridge 42. If a permanent attachment is desired, housing 40 is glued, sonic welded, bonded or the like to cartridge 42, such that an integral unit, like that shown, is formed. If a removable attachment is desired, housing 30 can be placed onto cartridge 42 by mechanical fasteners such as clips, snaps, latches, friction fits or the like.

Alternately, housing 40 can be remote from cartridge 42, provided chamber 50 (formed by the interior of the housing) can fill completely with liquid in order that float 30 functions properly. Cartridge 42 could be either upstream or downstream of housing 40, depending on the particular apparatus.

Figure 6:
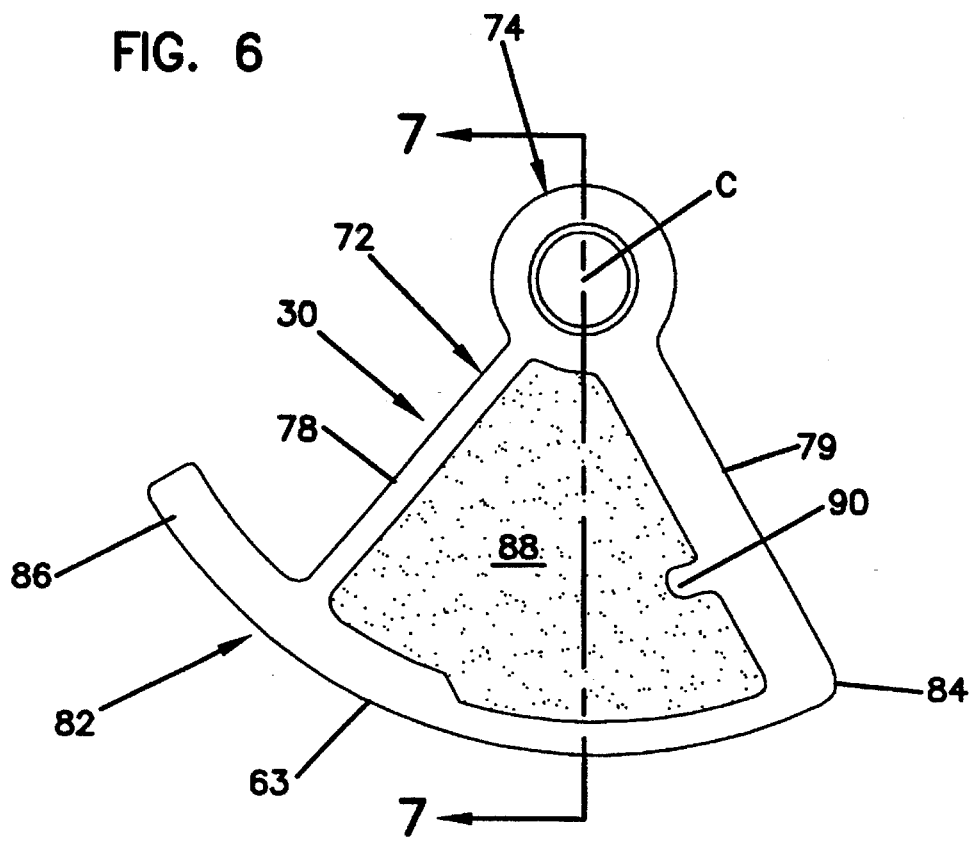
FIG. 6 is a side view of the float of the present invention.
Figure 7:
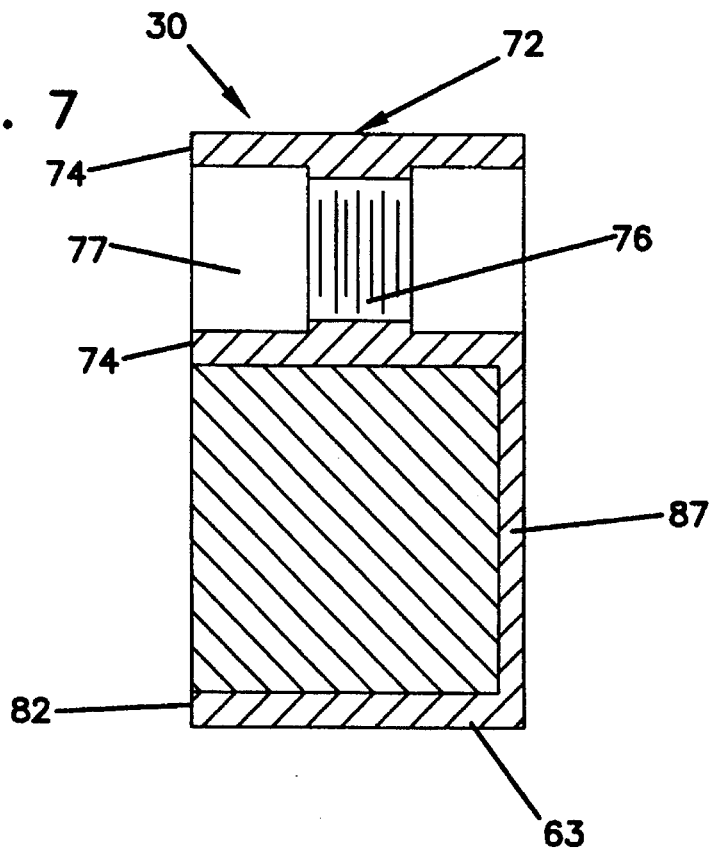
FIG. 7 is a cross-sectional view of the float of the invention taken along line 7—7 of FIG. 6.

FIGS. 6 and 7 show a detailed view of float 30. Float 30 includes a body 72, formed of a ring member 74. Ring member 74 includes a center point C and has a threaded portion 76 along its inner surface 77, to engage threaded rod 32 (FIGS. 1 and 3–5). Arms 78, 79 extend from ring member 74 and terminate in a cross-member 82 having an indicator surface 63. Cross-member 82 and indicator surface 63 extend from an elbow 84 to beyond arm 78 via a finger 86. Indicator surface 63 is at a constant radius from the center point C. Arms 78, 79 and finger 86 are bounded by a common wall 87. This wall 87 is flat and is oriented such that it faces sidewall 60 of housing 40, but will not accidentally rest on ledge 62 until float 30 has made the maximum number of rotations, traveling the maximum distance D (illustrated in FIG. 4).

Arms 78, 79 are of different thicknesses, and a portion of cross-member 82 leading to finger 86 is of a different thickness than the remainder of the cross-member 82. These characteristics are related to the buoyancy and weight of the float 30, which is discussed below.

A central panel 88 fits within the inside of body 72, bordered by arms 78, 79 and cross member 82. This central panel 88 is additionally secured within the inside of body 72 by a spacer 90 protruding from arm 79.

Body 72 is made of a material such as Acrylonitrile Butadiene Styrene (ABS) or the like. It is preferably an integral piece made by techniques such as injection molding or the like. Similarly, central panel 88 is an integral piece of closed cell foam or other equivalent material attached to body 72 by adhesive or other equivalent fastening techniques. It is preferred that the material of body 72 have a density near that of the water and the central panel 88 have a small density such that it may provide the buoyant force required, in order that float 30 functions properly. For example, in the disclosed embodiment, the ABS for body 72 has a density of approximately 1.05 gm/cm$^3$ while density of the closed cell foam for the central panel 88 has a density of approximately 0.01 gm/cm$^3$.

In use, apparatus 20 operates as water flows into housing 40 and specifically chamber 50 during each treatment cycle (use). Initially, chamber 50 containing float 30 is empty, and float 30 is in an upright (starting) position on threaded rod 32.

Float 30 is designed such that it becomes buoyant as chamber 50 fills with water, preferably completely. Filling occurs since the openings in grates 66, 68, as well as the water purifying media slow the water flow rate by virtue of frictional impediment or pressure drop. That is, on pouring water into upper reservoir 24 (FIG. 1), sufficient water remains in upper reservoir 24 (FIG. 1) to as to immerse chamber 50 until the water can flow through to housing 40 and cartridge 42. Once buoyant, and then on emptying of the water from chamber 50, float 30 rotates one turn.

More particularly, when float 30 is hanging free on rod 32, the center of gravity of float 30 is on a vertical line passing through the axis of rod 32. As water fills chamber 50, a center of buoyancy of float 30 develops, whose location on the particular geometry of water displaced by float 30. It is important, however, that the center of buoyancy be spaced to the side of the vertical on which the center of gravity lies which allows the buoyant force to create a torque for advancing float 30 along rod 32 in the desired direction. The torque due to the buoyant force dominates and moves the float until an equilibrium is established between the gravitational and buoyant forces when fully submersed. As water recedes in chamber 50, torque due to surface tension, and weight acting through the center of gravity in combination with buoyant forces acting through the changing center of buoyancy, continues to advance float 32 along rod 30 in providing a dominant torque until the float again hangs free with the center of gravity below rod 32 on the vertical passing through that axis of rod 32. Float 30 has now, however, been advanced one rotation along the cooperating threads of float 30 and rod 32. A cycle comprises sufficient filling of chamber 50 and then emptying of it so as to cause float 30 to rotate as indicated.

When float 30 has rotated through the maximum number of cycles corresponding to the life time of cartridge 42, float 30 impacts ledge 62 at a point when float 30 is in the inverted position so as to provide an appropriate visual indication through opening 46 and also to substantially close opening 46.

Figure 8:
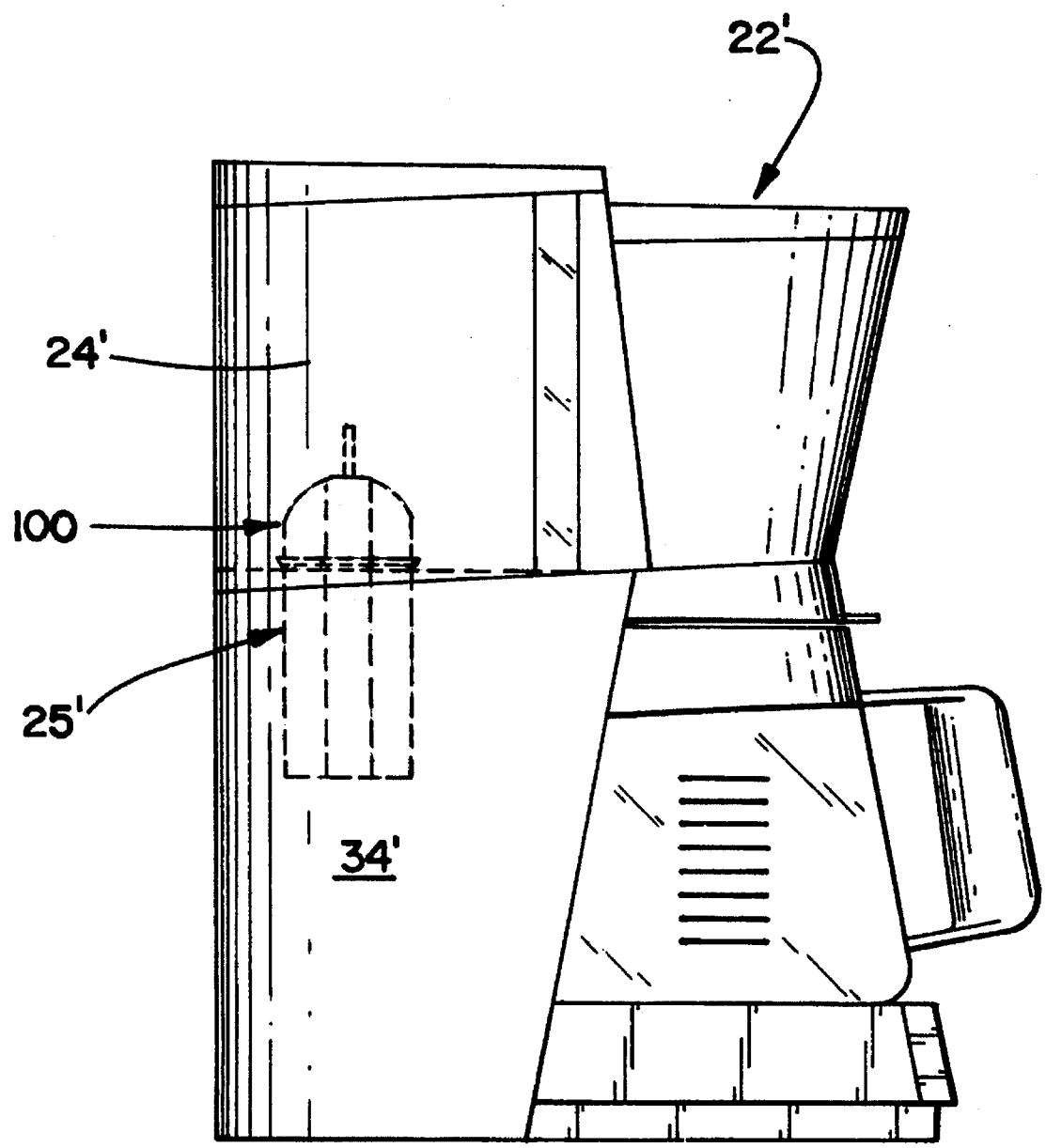
FIG. 8 is a plan view of an alternate embodiment apparatus in accordance with the present invention in use with a coffee maker.
Figure 9:
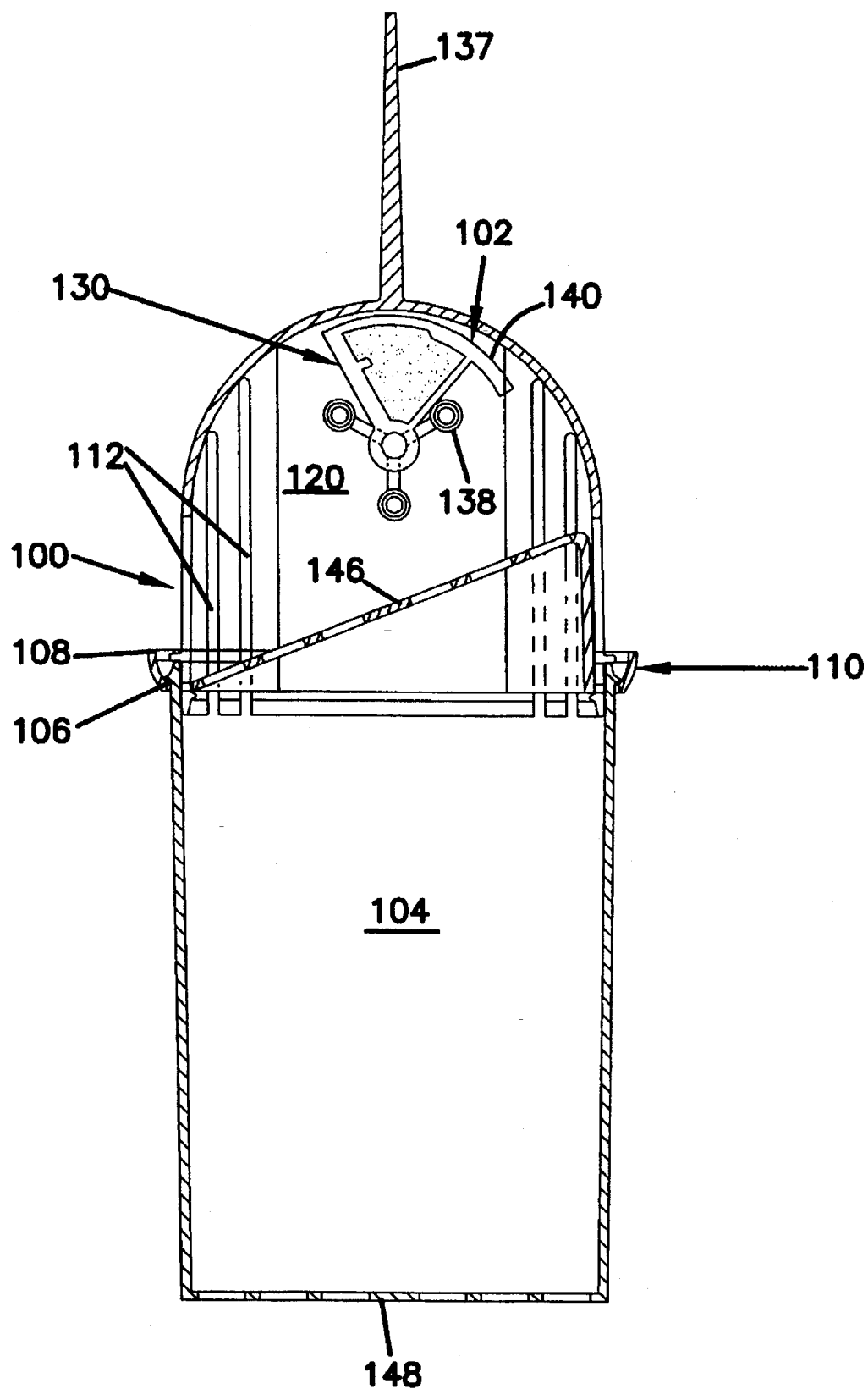
FIG. 9 is a lateral cross-sectional view of an the alternate embodiment apparatus of the present invention.
Figure 10:
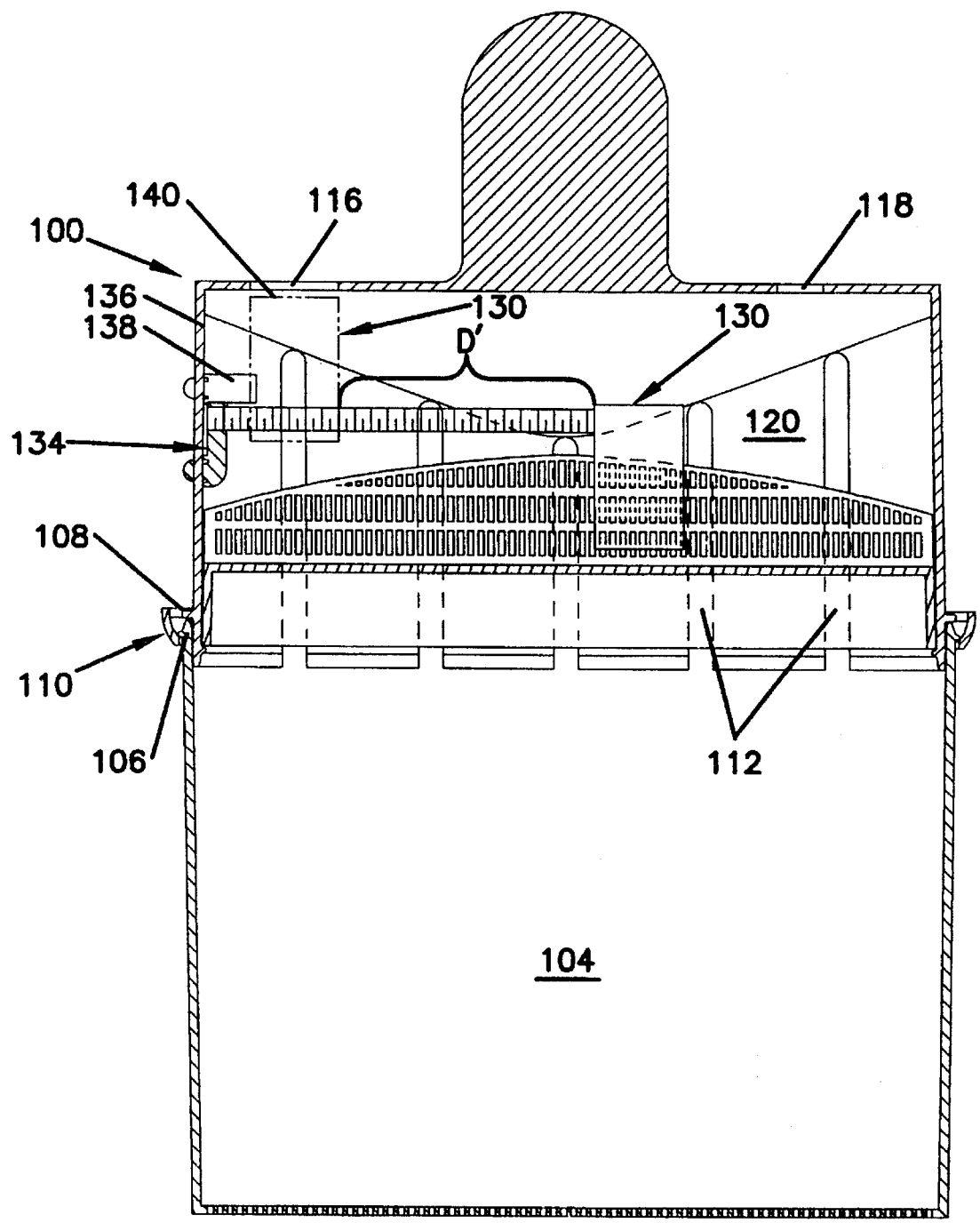
FIG. 10 is an enlarged longitudinal cross-sectional view of the alternate embodiment apparatus of the present invention.

FIGS. 8–10 show second apparatus 100 of the present invention for use with a coffee maker 22' or alternately, the carafe 22 described in FIGS. 1–3 and 5 above. Apparatus 100 is the same as apparatus 20 described in FIGS. 1–7 above except as indicated below. Apparatus 100 includes a housing 102 which is preferably rounded, and housing 102 extends substantially into upper reservoir 24' of coffee maker 22'. Housing 102 attaches to cartridge 104, similar to that described in FIGS. 1, 3 and 4 above, along a protruding rim 106, extending around its upper periphery. This protruding rim 106 is received by a peripheral claw 108 that extends around the lower periphery of housing 102. This peripheral claw 108 frictionally engages protruding rim 106, forming a rim/claw assembly 110.

Cartridge 104 is received in a pocket 25', preferably configured to the shape of cartridge 104. The pocket 25' forms a wall between the upper reservoir 24' and the lower reservoir 34', where the water is heated prior to being made into coffee. Should use with the carafe 22 (FIGS. 1–3 and 5) be desired, the rim/claw assembly 110 is then received in detent 25 in floor 23 of upper reservoir 24 of carafe 22, to properly retain apparatus 100 in carafe 22.

Housing 102 preferably includes slitted openings 112 at the sides, as well an opening 116 and an air hole 118 at the top. Openings 112, 116 and hole 118 allow water to enter (and leave) a chamber 120 formed by the interior of housing 102 and cartridge 104. Slitted openings 112 are necessary since chamber 120 and housing 102 extend upwardly into reservoir 24'. Openings 112 allow complete drainage of reservoir 24'. Float 130 is rotationally mounted on threaded rod 132 within chamber 120. Threaded rod 132 terminates in end member 134, mounted as a bracket to a sidewall 136 of housing 102. Opening 116 provides a view into chamber 120 for observing the position of float 130. Housing 102 includes a tab 137 which the user holds when removing apparatus 100 from coffee maker 22' or separating housing 102 and cartridge 104 (if housing 102 is designed to be removable from cartridge).

Once float 130 has traveled a distance D' on threaded rod 132, it comes to rest against a ledge 138, which protrudes from end member 134. Float 130 in this inverted terminal position (FIG. 9, shown in phantom in FIG. 10), rests against ledge 138, such that its indicator (or bottom) surface 140 can be viewed through opening 116. This indicator surface 140 is preferably red or other color which provides a sharp contrast to the color of the top of the housing 102. Accordingly, the user is now alerted that the cartridge is spent, or nearly spent, and should be attended to, by refilling, replacing, or otherwise revitalizing it, depending on the type of cartridge employed.

Float 130 and threaded rod 132 are identical in all aspects to float 30 and threaded rod 32 detailed in FIGS. 1–7 above. Accordingly, float 130 and threaded rod 132 are configured in accordance with the respective float 30 and threaded rod 32 described in FIGS. 1–7 above, in order to operate identically to that of the first apparatus 20 described above.

Housing 102 is preferably made of plastic and can be attached in a removable or permanent manner to cartridge 104. If a removable attachment is desired, like the friction fit detailed above, claw 108 or other equivalent structure of housing 102 can be placed onto protruding rim 106, or other equivalent structure of cartridge 104 by mechanical fasteners such as clips, snaps, latches, or the like. If a permanent attachment is desired, housing 102 is glued, sonic welded, bonded or the like to cartridge 104.

The cartridge 104 includes a holder 143 with an inclined grate 146 at its upper end, which when combined with housing 102 serves as the bottom of chamber 120. Although an inclined grate 146 is preferred, various angles of inclination for grate 146 as well as a flat grate are also permitted. The lower end of cartridge 104 is also formed as a grate 148. Both grates 146, 148 include openings sized to retain resin or other water purifying material in cartridge 104, so it can not leave and enter the water. One or both of upper and lower grates 146, 148 may be removable from holder 143 in order that cartridge 104 be refilled or rejuvenated. Alternately, upper and lower grates 146, 148 may be permanently attached to holder 143, by adhesive bonding, sonic welding or the like, such that cartridge 104 is disposable. Cartridge 104 is preferably made of plastic, although other suitable materials are also permissible.

While embodiments of the present invention have been described so as to enable one skilled in the art to practice the techniques of the present invention, the preceding description is intended to be exemplary and should not be used to limit the scope of the invention, which should be determined by reference to the following claims.

What is claimed is:

1. A device, comprising:
    a container having first and second reservoirs separated by a wall;
    an apparatus for treatment of water and indicating end of life including a water treatment unit, a housing which in combination with said water treatment unit forms a chamber, said housing having an opening arranged for the ingress of water to fill said chamber and the egress of water to empty said chamber, respectively, the filling and emptying of said chamber of water defining at least one cycle, said chamber being in fluid communication with said water treatment unit, an end of life indicator for said water treatment unit, said indicator being mounted in said chamber and including a member constructed and arranged to be moved by the filling and by the emptying of said chamber and means for advancing said member toward an end point during said at least one cycle; and
    means for holding said apparatus at said wall between said first and second reservoirs;

wherein water flows from said first reservoir through said apparatus for treatment and indicating to said second reservoir from which the water can be accessed for subsequent usage.

2. The device in accordance with claim 1, wherein said member is a float and said advancing means includes a support member for said float, said advancing means further including means for attaching said support member to said housing, said support member including means for restricting movement of said float to an incremental distance for said at least one cycle.

3. The device in accordance with claim 2, wherein said at least one cycle is a single cycle, said advancing means also includes means for terminating the movement of said float so that said float is positioned in a terminal inverted orientation, wherein the terminal inverted orientation represents completion of float travel due to movement through a plurality of said incremental distances corresponding to the number of said single cycles equivalent to the usable life of the water treatment unit.

4. The device in accordance with claim 3, wherein said float includes a bottom surface, said opening positioned so that said bottom surface is viewable through said opening when said float is in the terminal inverted orientation.

5. The device in accordance with claim 4, wherein said support member has an axis and said float has a first length between said axis and said bottom surface, said first length being only slightly less than a second length between said axis and said opening, so that said bottom surface closes said opening when said float is in said terminal inverted orientation.

6. The device in accordance with claim 2, wherein said restricting means includes first threads on said support member and second threads on said float, said first and second threads cooperating with one another.

7. A device, comprising:

a container having first and second reservoirs separated by a wall;

an apparatus for treatment of water and indicating end of life including a water treatment unit, a chamber in fluid communication with said water treatment unit through which the water entering into the water treatment unit passes, each pass of water through said chamber defining at least one cycle, and an end of life indicator for said water treatment unit, said indicator being mounted in said chamber and including a float and a support member for said float, said support member having an axis, said indicator further including means for torquing with said water passing through said chamber to advancing said float axially along said support member an incremental length for said at least one cycle; and means for holding said apparatus at said wall between said first and second reservoirs;

wherein water flows from said first reservoir through said apparatus for treatment and indicating to said second reservoir from which the water can be accessed for subsequent usage.

8. The device in accordance with claim 7, wherein said torquing means includes first threads on said support member and second threads on said float, said first and second threads cooperating with one another, said float including material having a center of buoyancy and a center of gravity such that the center of buoyancy and buoyant force of said float result in a first torquing which axially advances said float along said support member as water passes through said chamber and immerses said float, and such that a surface tension acting on said float, the center of gravity, and weight of said float result in a second torquing which axially advances said float along said support member as water recedes from immersing said float.

9. Apparatus for treatment of water and indicating end of life, comprising:

a water treatment unit;

a housing which in combination with said water treatment unit forms a chamber, said housing having an opening arranged for the ingress of water to fill said chamber and the egress of water to empty said chamber, respectively, the filling and emptying of said chamber of water defining at least one cycle, said chamber being in fluid communication with said water treatment unit; and an end of life indicator for said water treatment unit, said indicator being mounted in said chamber and including a member constructed and arranged to be moved by the filling and by the emptying of said chamber and means for advancing said member toward an end point during said at least one cycle.

10. The apparatus in accordance with claim 9, wherein said member is a float and said advancing means includes a support member for said float, said advancing means further including means for attaching said support member to said housing, said support member including means for restricting movement of said float to an incremental distance for said at least one cycle.

11. The apparatus in accordance with claim 10, wherein said at least one cycle is a single cycle, said advancing means also includes means for terminating the movement of said float so that said float is positioned in a terminal inverted orientation, wherein the terminal inverted orientation represents completion of float travel due to movement through a plurality of said incremental distances corresponding to the number of said single cycles equivalent to the usable life of the water treatment unit.

12. The apparatus in accordance with claim 11, wherein said float includes a bottom surface, said housing includes a top portion, said opening in said housing positioned in said top portion so that said bottom surface is viewable through said opening when said float is in the terminal inverted orientation.

13. The apparatus in accordance with claim 12 wherein said support member has an axis and said float has a first length between said axis and said bottom surface, said first length being only slightly less than a second length between said axis and said opening, so that said bottom surface closes said opening when said float is in said terminal inverted orientation.

14. The apparatus in accordance with claim 10, wherein said restricting means includes first threads on said support member and second threads on said float, said first and second threads cooperating with one another.

15. Apparatus for treatment of water and indicating end of life, comprising:

a water treatment unit;

a chamber in fluid communication with said water treatment unit through which the water entering into the water treatment unit passes, each pass of water through said chamber defining at least one cycle; and an end of life indicator for said water treatment unit, said indicator being mounted in said chamber and including a float and a support member for said float, said support member having an axis, said indicator further including means for torquing with said water passing through said chamber for advancing said float axially along said support member an incremental length for said at least one cycle.

16. The apparatus in accordance with claim 15, wherein said torquing means includes first threads on said support member and second threads on said float, said first and second threads cooperating with one another, said float including material having a center of buoyancy and a center of gravity such that the center of buoyancy and buoyant force of said float result in a first torquing which axially advances said float along said support member as water passes through said chamber and immerses said float, and such that a surface tension acting on said float, the center of gravity, and weight of said float result in a second torquing which axially advances said float along said support member as water recedes from immersing said float.

* * * * *